United States Patent
Mao et al.

(10) Patent No.: US 8,129,463 B2
(45) Date of Patent: Mar. 6, 2012

(54) CARBON NANOTUBE-REINFORCED NANOCOMPOSITES

(75) Inventors: Dongsheng Mao, Austin, TX (US); Zvi Yaniv, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 756 days.

(21) Appl. No.: 11/693,454

(22) Filed: Mar. 29, 2007

(65) Prior Publication Data
US 2008/0300357 A1 Dec. 4, 2008

Related U.S. Application Data

(60) Provisional application No. 60/788,234, filed on Mar. 31, 2006, provisional application No. 60/810,394, filed on Jun. 2, 2006.

(51) Int. Cl.
C08K 3/04 (2006.01)
B32B 38/03 (2006.01)
C01B 31/04 (2006.01)

(52) U.S. Cl. ......... 524/496; 524/495; 428/413; 977/752

(58) Field of Classification Search .................. 524/496, 524/495; 977/752; 428/413; 264/108
See application file for complete search history.

(56) References Cited

U.S. PATENT DOCUMENTS

| | | |
|---|---|---|
| 5,096,556 A | 3/1992 | Corrigan et al. |
| 5,565,505 A | 10/1996 | Papalos et al. |
| 5,565,506 A | 10/1996 | Papalos et al. |
| 5,569,715 A | 10/1996 | Grandhee |
| 5,604,269 A | 2/1997 | Papalos et al. |
| 5,623,046 A | 4/1997 | Papalos et al. |
| 5,652,323 A | 7/1997 | Papalos et al. |
| 5,719,210 A | 2/1998 | Arora et al. |
| 5,750,595 A | 5/1998 | Arora et al. |
| 5,760,108 A | 6/1998 | Arora et al. |
| 5,763,506 A | 6/1998 | Papalos et al. |
| 5,786,420 A | 7/1998 | Grandhee |
| 5,854,313 A | 12/1998 | Omori et al. |
| 5,969,030 A | 10/1999 | Grandhee |

(Continued)

FOREIGN PATENT DOCUMENTS

JP 57011017 1/1982

(Continued)

OTHER PUBLICATIONS

Gojny, et al; "Carbon nanotube-reinforced epoxy-composites: enhanced stiffness and fracture toughness at low nanotube content"; *Composites Science and Technology*, vol. 64, Issue 15; Developments in carbon nanotube and nanofibre reinforced polymers, Nov. 2004; pp. 2363-2371.

(Continued)

*Primary Examiner* — Milton I Cano
*Assistant Examiner* — Darcy D Laclair
(74) *Attorney, Agent, or Firm* — Kelly Kordzik; Matheson Keys Garsson & Kordzik PLLC

(57) ABSTRACT

A combination of MWNTs (herein, MWNTs have more than 2 walls) and DWNTs significantly improves the mechanical properties of polymer nanocomposites. A small amount of DWNTs reinforcement (<1 wt. %) significantly improves the flexural strength of epoxy matrix nanocomposites. A same or similar amount of MWNTs reinforcement significantly improves the flexural modulus (stiffness) of epoxy matrix nanocomposites. Both flexural strength and flexural modulus of the MWNTs and DWNTs-coreinforced epoxy nanocomposites are further improved compared with same amount of either DWNTs or MWNTs-reinforced epoxy nanocomposites. In this epoxy/DWNTs/MWNTs nanocomposite system, SWNTs may also work instead of DWNTs. Besides epoxy, other thermoset polymers may also work.

12 Claims, 3 Drawing Sheets

U.S. PATENT DOCUMENTS

| | | | |
|---|---|---|---|
| 6,066,448 | A | 5/2000 | Wohlstadter et al. |
| 6,090,545 | A | 7/2000 | Wohlstadter et al. |
| 6,140,045 | A | 10/2000 | Wohlstadter et al. |
| 6,294,596 | B1 | 9/2001 | Papalos et al. |
| 6,303,672 | B1 | 10/2001 | Papalos et al. |
| 6,333,016 | B1 | 12/2001 | Resasco et al. |
| 6,524,777 | B1 | 2/2003 | Whitesides et al. |
| 6,627,689 | B2 | 9/2003 | Iino et al. |
| 6,689,835 | B2 | 2/2004 | Amarasekera et al. |
| 6,702,969 | B2 | 3/2004 | Matuana et al. |
| 6,770,583 | B2 | 8/2004 | Keller |
| 6,800,946 | B2 | 10/2004 | Chason et al. |
| 6,846,345 | B1 | 1/2005 | Keller et al. |
| 6,962,892 | B2 | 11/2005 | Resasco et al. |
| 6,971,391 | B1 | 12/2005 | Wang et al. |
| 6,986,853 | B2 | 1/2006 | Glatkowski et al. |
| 6,994,907 | B2 | 2/2006 | Resasco et al. |
| 7,005,550 | B1 | 2/2006 | Tan et al. |
| 7,073,201 | B2 | 7/2006 | Sunada et al. |
| 7,074,310 | B2 | 7/2006 | Smalley et al. |
| 7,078,683 | B2 | 7/2006 | Joyce |
| 7,094,367 | B1 | 8/2006 | Harmon et al. |
| 7,094,386 | B2 | 8/2006 | Resasco et al. |
| 7,138,444 | B2 | 11/2006 | McGee et al. |
| 7,153,903 | B1 | 12/2006 | Barraza et al. |
| 7,162,302 | B2 | 1/2007 | Wang et al. |
| 2002/0150524 | A1 | 10/2002 | Smalley et al. |
| 2003/0027357 | A1 | 2/2003 | Sigal et al. |
| 2003/0099798 | A1 | 5/2003 | George et al. |
| 2003/0151030 | A1 | 8/2003 | Gurin |
| 2004/0077771 | A1 | 4/2004 | Wadahara et al. |
| 2004/0089851 | A1 | 5/2004 | Wang et al. |
| 2005/0008560 | A1 | 1/2005 | Kataoka et al. |
| 2005/0127329 | A1 | 6/2005 | Wang et al. |
| 2005/0191491 | A1 | 9/2005 | Wang et al. |
| 2005/0229328 | A1 | 10/2005 | Tran |
| 2006/0041104 | A1 | 2/2006 | Ait-Haddou et al. |
| 2006/0270790 | A1 | 11/2006 | Comeau |
| 2007/0004857 | A1 | 1/2007 | Barraza et al. |
| 2007/0023839 | A1 | 2/2007 | Furukawa et al. |
| 2007/0183959 | A1 | 8/2007 | Charlier et al. |
| 2007/0276077 | A1 | 11/2007 | Mao et al. |
| 2008/0152913 | A1 | 6/2008 | Shinbach et al. |

FOREIGN PATENT DOCUMENTS

| | | |
|---|---|---|
| JP | 2005082832 | 3/2005 |
| WO | WO 2004/001107 | 12/2003 |
| WO | WO2005/012171 | 2/2005 |
| WO | WO2005/028174 | 3/2005 |
| WO | WO 2006/104689 | 10/2006 |

OTHER PUBLICATIONS

Gojny, et al; "Surface modified multi-walled carbon nanotubes in CNT/epoxy-composites"; *Chemical Physics Letters*; vol. 370, Issues 5-6, Mar. 21, 2003; pp. 820-824.

International Search Report and Written Opinion mailed Jun. 16, 2008, 11 pages.

Lam, Chun-ki et al.; Effect of Ultrasound Sonication in Nanoclay Clusters of Nanoclay/Epoxy Composites; *Materials Letters*; vol. 59, pp. 1369-1372, Jan. 18, 2005.

Fornes, T.D. et al.; Nylon-6 Nanocomposites from Alkylammonium-Modified Clay: The Role of Alkyl Tails on Exfoliation; *Macromolecules*; vol. 37, pp. 1793-1798, Jan. 29, 2004.

Mhetre, Shamal K. et al.; Nanocomposites with Functionalized Carbon Nanotubes; *Mat. Res. Soc. Symp. Proc.*; vol. 788, pp. L11.17.1-L11.17.6, 2004.

Iijima, S., "Helical microtubules of graphitic carbon," *Nature* vol. 354, pp. 56-58 (Nov. 7, 1991). Published by Nature Publishing Group, New York, NY, USA. [Online], [Retrieved on Apr. 3, 2006]. Retrieved from the Internet: <URL: http://www.nature.com/nature/journal/v354/n6348/abs/354056a0.html>.

Wong, E., et al., "Nanobeam Mechanics: Elasticity, Strength, and Toughness of Nanorods and Nanotubes," *Science* vol. 277, pp. 1971-1975 (Sep. 26, 1977).

Cho, J.W. et al.; Nylon 6 Nanocomposites by Melt Compounding; *Polymer*; vol. 42, 2001, pp. 1083-1094, Feb. 24, 2000.

Ratna. D et al.; Clay-reinforced Epoxy Nanocomposites; *Polymer International*; vol. 52. 2003, pp. 1403-1407, 2003.

Salahuddin, N. et al.; Nanoscale Highly Filled Epoxy Nanocomposite; *European Polymer Journal*; vol. 38, pp. 1477-1482. May 8, 2000.

Zhane. Kailiang et al.; Preparation and Characterization of Modified-Clay-Reinforced and Toughened Epoxy-Resin Nanocomposites; *Journal of Applied Polymer Science*; vol. 91, 2004, pp. 2649-2652, Jan. 24, 2003.

Thostenson et al.; Carbon Nanotube/Carbon Fiber Hybrid Multiscale Composites; Journal of Applied Physics: vol. 91, No. 9, May 1, 2002.

International Search Report and Written Opinion from the International Searching Authority for PCT/US08/78306 filed Sep. 30, 200, mailed May 17, 2009, 5 pages.

European Examiner Gerhard Hillebrand, European Search Report for Application No. PCT/US2007/065630, dated Aug. 5, 2009, 3 pages.

International Search Report and Written Opinion from the International Searching Authority, PCT/US08/78306, mailed Mar. 17, 2009, 6 pages.

Georgakilas et al., "Organic Derivatization of Single-Walled Carbon Nanotubes by Claims and Intercalated Derivatives," Carbon, vol. 42, 2004, pp. 865-870.

www.microfluidicscorp.com/images/stories/pdf/hc.pdf, Microtluidics (1998).

International Search Report and Written Opinion from the International Searching Authority, PCT/US07/65923, mailed Jun. 6, 2008, 9 pages.

Derwent Acc No. 1982-16395E (1982) Abstract for Ishikawa, K., Sugimoto, H., and Yamamoto, T., Publications JP 57011017 and JP 83046245.

Machine Translation of JP 2005082832.

European Office Action, Application No. 07759819.1, dated Oct. 8, 2009.

Gojny et al., "Influence of different carbon nanotubes on the mechanical properties of epoxy matrix composites—A comparative study," Composites Science and Technology; Apr. 21, 2005. Available online at www.sciencedirect.com.

Zhu et al., "Improving the Dispersion and Integration of Single-Walled Carbon Nanotubes in Epoxy Composites through Functionalization," Nano Letters, Jun. 26, 2003, vol. 3, No. 8, pp. 1107-1113.

Fornes et al., "Structure and Properties of Nanocomposites Based on Nylon-11 and -12 Compared with Those Based on Nylon-6," Macromolecules; Jun. 22, 2004, 37, pp. 7698-7709.

International Search Report and Written Opinion from the International Searching Authority, PCT/US10/26012, mailed May 11, 2010, 7 pages.

US International Searching Authority, International Preliminary Report on Patentability, International Application No. PCT/US2008/078306, mailed Feb. 3, 2011.

The State Intellectual Property Office of The People's Republic of China, Notice on the First Office Action, Application No. 200780017502.3, Jul. 1, 2011.

CARBON NANOTUBE-REINFORCED NANOCOMPOSITES

This application claims priority to U.S. Provisional Application Ser. Nos. 60/788,234 and 60/810,394.

BACKGROUND INFORMATION

Since their first observation by Iijima in 1991 carbon nanotubes (CNTs) have been the focus of considerable research (S, Iijima, 'Helical microtubules of graphitic carbon', Nature 354, 56 (1991)). Many investigators have reported the remarkable physical and mechanical properties of this new form of carbon. CNTs typically are 0.5-1.5 nm in diameter for single wall CNTs (SWNTs), 1-3 nm in diameter for double wall CNTs (DWNTs), and 5 nm to 100 nm in diameter for multi-wall CNTs (MWNTs). From unique electronic properties and a thermal conductivity higher than that of diamond to mechanical properties where the stillness, strength and resilience exceeds that of any current material. CNTs offer tremendous opportunity for the development of fundamental new material systems. In particular, the exceptional mechanical properties of CNTs (E>1.0 TPa and tensile strength of 50 GPa) combined with their low density (1-2.0 g/cm$^3$) make them attractive for the development of CNT-reinforced composite materials (Eric W, Wong, Paul E. Sheehan, Charles M. Lieber, "Nanobeam Mechanics: Elasticity, Strength, and Toughness of Nanorods and Nanotubes", Science 277, 1971 (1997)). CNTs are the strongest material known on earth. Compared with MWNTs, SWNTs and DWNTs have even more promising as reinforcing materials for composites because of their higher surface area and higher aspect ratio. Table 1 lists surface area and aspect ratio of SWNTs, DWNTs, and MWNTs.

TABLE 1

|  | SWNTs | DWNTs | MWNTs |
| --- | --- | --- | --- |
| Surface area (m$^2$/g) | 300-600 | 300-400 | 40-300 |
| Geometric aspect ratio (length/diameter) | ~10,000 | ~5,000 | 100~1000 |

A problem is that both SWNTs and DWNTs are more expensive that MWNTs. The price of both purified SWNTs and DWNTs can be as high as $500/g while that of purified MWNTs is $1-10/g. Thus, the cost of MWNTs-reinforced nanocomposites is much lower than that of either SWNTs or DWNTs-reinforced nanocomposites.

DETAILED DESCRIPTION

A combination of MWNTs (herein, MWNTs have more than 2 walls) and DWNTs significantly improves the mechanical properties of polymer nanocomposites. A small amount of DWNTs reinforcement (<1 wt. %) significantly improves the flexural strength of epoxy matrix nanocomposites. A same or similar amount of MWNTs reinforcement significantly improves the flexural modulus (stiffness) of epoxy matrix nanocomposites. Both flexural strength and flexural modulus of the MWNTs and DWNTs-coreinforced epoxy nanocomposites are further improved compared with same amount of either DWNTs or MWNTs-reinforced epoxy nanocomposites. In this epoxy/DWNTs/MWNTs nanocomposite system, SWNTs may also work instead of DWNTs. Besides epoxy, other thermoset polymers may also work.

In one embodiment of the present invention, a detailed example of this embodiment is given in an effort to better illustrate the invention.

Epoxy resin (bisphenol-A) was obtained from Arisawa Inc., Japan. The hardener (dicyandiamide) was obtained from the same company which was used to cure the epoxy nanocomposites. Both DWNTs and MWNTs were obtained from Nanocyl, Inc., Belgium. Those CNTs were functionalized with amino (—NH$_2$) functional groups. Amino-functionalized CNTs may help to improve the bonding between the CNTs and epoxy molecular chairs which can further improve the mechanical properties of the nanocomposites. But, pristine CNTs or functionalized by other ways (such as carboxylic functional groups) may also work (e.g., pellets obtained from Arkema Co., Japan (product name: RILSAN BMV-P20 PA11). Clay was provided by Southern Clay Products, U.S. (product name: Cloisite® series 93A). It is a natural montmorillonite modified with a ternary ammonium salt. The elastomer was styrene/ethylene butylenes/styrene (SEBS) purchased from Kraton Inc., U.S. (product name: G1657).

Figure 1:
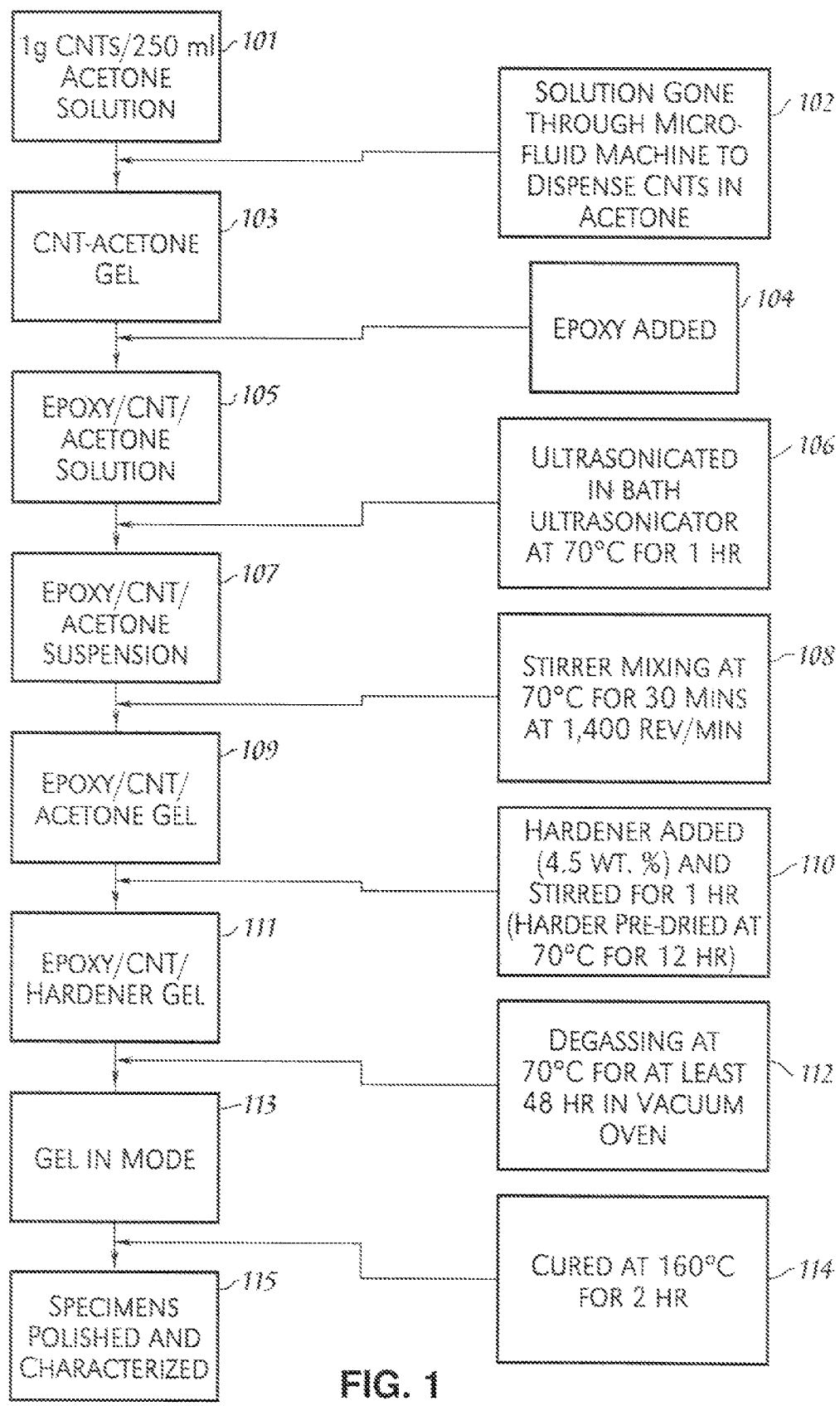
FIG. 1 illustrates a process for manufacturing epoxy/CNT nanocomposites.

FIG. 1 illustrates a schematic diagram of a process flow to make epoxy/CNT nanocomposites. All ingredients were dried in a vacuum oven at 70° C. for at least 16 hours to fully eliminate moisture, CNTs were put in acetone 101 and dispersed by a micro-fluidic machine is step 102 (commercially available from Microfluidics Co.). The micro-fluidic machine uses high-pressure streams that collide at ultra-high velocities in precisely defined micron-sized channels. Its combined threes of shear and impact act upon products to create uniform dispersions. The CNT/acetone was then formed as a gel 103 resulting in the CNTs well dispersed in the acetone solvent. However, other methods, such as an ultrasonication process may also work. A surfactant may be also used to disperse CNTs in solution. Epoxy was then added in step 104 to the CNT/acetone gel to create an epoxy/CNT/acetone solution 105, which was followed by an ultrasonication process in a bath at 70° C. for 1 hour (step 106) to create an epoxy/CNT/acetone suspension 107. The CNTs were further dispersed in epoxy in step 108 using a stirrer mixing process at 70° C. for half an hour at a speed of 1,400 rev/min. to create an epoxy/CNT/acetone gel 109. A hardener was than added in step 110 to the epoxy/CNT/acetone gel 109 at a ratio of 4.5 wt. % followed by stirring at 70° C. for 1 hour. The resulting gel 111 was degassed in step 112 in a vacuum oven at 70° C. for at least 48 hours. The material 113 was then poured into a Teflon mold and eared at 160° C. for 2 hours. Mechanical properties (flexural strength and flexural modulus) of the specimens were characterized after a polishing process 115.

Figure 2:
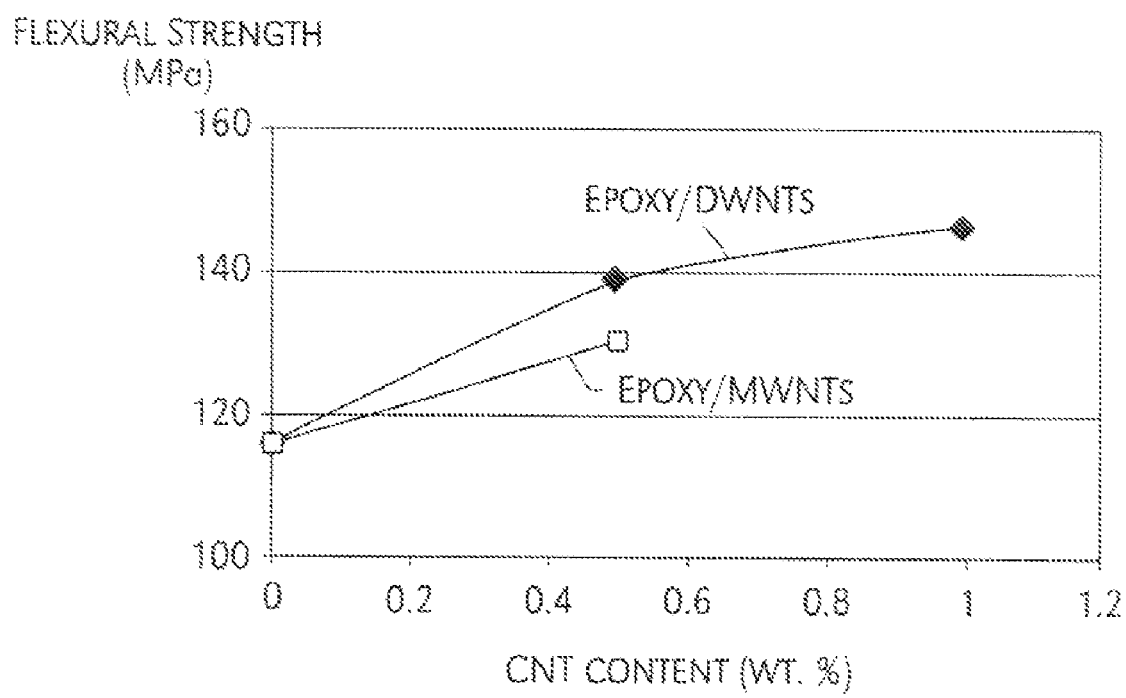
FIG. 2 illustrates a graph showing the flexural strength of epoxy nanocomposites.
Figure 3:
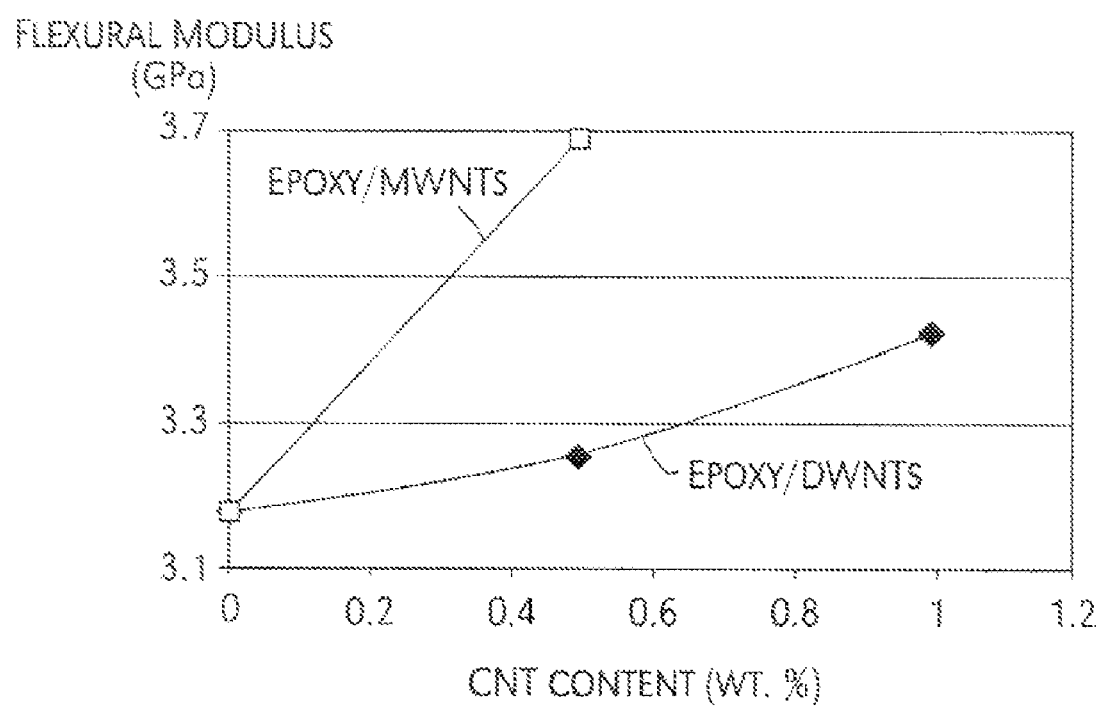
FIG. 3 illustrates a graph showing the flexural modulus of epoxy nanocomposites.

Table 2 shows the mechanical properties (flexural strength and flexural modulus) of the epoxies made using the process flow of FIG. 1 to make epoxy/CNT nanocomposites. As shown in FIG. 2, the flexural strength of epoxy/DWNTs is higher than that of epoxy/MWNTs at the same loading of CNTs, while the flexural modulus of epoxy/DWNTs is lower than that of epoxy/MWNTs at the same loading of CNTs, as shown in FIG. 3. Both the flexural strength and flexural modulus of epoxy/DWNTs (0.5 wt. %)/MWNTs (0.5 wt. %) are higher than those of epoxy/DWNTs (1 wt. %).

TABLE 2

| Epoxy material | Flexural strength (MPa) | Flexural modulus (GPa) |
|---|---|---|
| Neat epoxy | 116 | 3.18 |
| Epoxy/MWMTs (0.5 wt. %) | 130.4 | 3.69 |
| Epoxy/DWNTs (0.5 wt. %) | 138.9 | 3.26 |
| Epoxy/DWNTs (1 wt. %) | 143.6 | 3.43 |
| Epoxy/DWNTs(0.5 wt. %)/MWNTs(0.5 wt. %) | 154.2 | 3.78 |

What is claimed:

1. A composite material comprising:
a thermoset;
double-walled carbon nanotubes; and
multi-walled carbon nanotubes,
wherein a total concentration of the carbon nanotubes includes a concentration of the double-walled carbon nanotubes and a concentration of the multi-walled carbon nanotubes selected such that the composite material has a flexural strength and a flexural modulus that exceed the flexural strength and the flexural modulus, respectively, of a composite material comprising the thermoset and substantially a same total concentration of either double-walled carbon nanotubes or multi-walled carbon nanotubes.

2. The material as recited in claim 1, wherein the concentrations of the double-walled carbon nanotubes and the multi-walled carbon nanotubes are optimal for increasing both the flexural strength and the flexural modulus of the composite material.

3. The material as recited in claim 2, wherein the concentration of the double-walled carbon nanotubes is between 0.01-40 wt. %.

4. The material as recited in claim 2, wherein the concentration of the double-walled carbon nanotubes is between 0.01-20 wt. %.

5. A composite comprising a content of thermoset of 60-99.98 wt.%, a content of multi-walled carbon nanotubes of 0.01-20 wt.%, and a content of double-walled carbon nanotubess of 0.01-20 wt. %.

6. The composite of claim 5, wherein the thermoset comprises an epoxy.

7. A method for making a carbon nanotube composite by varying an amount of carbon nanotubes to be added to the composite as a function of the diameters of the carbon nanotubes to increase the flexural strength and the flexural modulus of the carbon nanotube composite.

8. The method as recited in claim 7, wherein the carbon nanotubes are double-walled carbon nanotubes.

9. The method as recited in claim 7, wherein the carbon nanotubes are multi-walled carbon nanotubes.

10. The method as recited in claim 7, wherein a ratio of double-walled carbon nanotubes to multi-walled carbon nanotubes within the composite is varied to increase the flexural strength and the flexural modulus of the carbon nanotube composite.

11. The method as recited in claim 10, wherein the composite further comprises a thermoset.

12. The method as recited in claim 10, wherein the composite further comprises an epoxy.

* * * * *